US009618271B2

(12) United States Patent
Diem et al.

(10) Patent No.: US 9,618,271 B2
(45) Date of Patent: Apr. 11, 2017

(54) DEVICE FOR THE EXCHANGE OF HEAT AND MOTOR VEHICLE

(75) Inventors: Johannes Diem, Weissach (DE); Eberhard Pantow, Winnenden (DE); Ulrich Maucher, Korntal-Muenchingen (DE); Peter Geskes, Ostfildern (DE); Martin Kaemmerer, Esslingen (DE); Michael Schmidt, Bietigheim-Bissingen (DE); Klaus Irmler, Tuebingen (DE); Jens Holdenried, Ditzingen (DE); Steffen Brunner, Weissach im Tal (DE)

(73) Assignee: MAHLE International GmbH, Stuttgart (DE)

( * ) Notice: Subject to any disclaimer, the term of this patent is extended or adjusted under 35 U.S.C. 154(b) by 638 days.

(21) Appl. No.: 12/723,286

(22) Filed: Mar. 12, 2010

(65) Prior Publication Data

US 2010/0282452 A1    Nov. 11, 2010

(30) Foreign Application Priority Data

Mar. 12, 2009  (DE) ......................... 10 2009 012 493
Oct. 27, 2009  (DE) ......................... 10 2009 050 889

(51) Int. Cl.
F28D 1/03       (2006.01)
F28F 3/12       (2006.01)
(Continued)

(52) U.S. Cl.
CPC .......... *F28D 9/0043* (2013.01); *F01K 23/065* (2013.01); *F01K 25/10* (2013.01);
(Continued)

(58) Field of Classification Search
USPC ................................ 165/167, 153, 170, 166
See application file for complete search history.

(56) References Cited

U.S. PATENT DOCUMENTS 1,770,254 A * 7/1930 Seligman ........................ 165/167
1,823,788 A * 9/1931 Dewoitine ..................... 165/166
(Continued)

FOREIGN PATENT DOCUMENTS

CN      1214115 A      4/1999
CN    101952005 A      1/2011
(Continued)

OTHER PUBLICATIONS

Chinese Office Action for Chinese Application No. 201080048294.5 dated Jul. 22, 2013 with English translation.
(Continued)

*Primary Examiner* — Leonard R Leo
(74) *Attorney, Agent, or Firm* — Muncy, Geissler, Olds & Lowe, P.C.

(57) ABSTRACT

A device for the exchange of heat between a first and a second medium with pairs of trays stacked one on top of the other in a stacking direction is provided, wherein a first flow chamber that can be flowed through by a first medium is provided between the two trays of at least one pair of trays or several pairs of trays and a second flow chamber that can be flowed through by a second medium is provided between two pairs of trays adjacent to one another, wherein the first flow chamber has first flow path with flow path sections that can be flowed through consecutively in opposite directions for the first medium, which are separated from one another by a division wall arranged between the at least two trays of the at least one pair of trays, and wherein the second flow chamber has a second flow path for the second medium.

8 Claims, 7 Drawing Sheets

(51) Int. Cl.
  *F28D 9/00* (2006.01)
  *F01K 23/06* (2006.01)
  *F01K 25/10* (2006.01)
  *F01N 5/02* (2006.01)
  *F28F 3/00* (2006.01)
  *F28D 21/00* (2006.01)

(52) U.S. Cl.
  CPC .............. *F01N 5/02* (2013.01); *F28D 1/035* (2013.01); *F28D 9/0056* (2013.01); *F28F 3/00* (2013.01); *F01N 2240/02* (2013.01); *F28D 1/0316* (2013.01); *F28D 1/0325* (2013.01); *F28D 21/0003* (2013.01); *F28D 2021/0071* (2013.01); *F28F 3/12* (2013.01); *Y02T 10/16* (2013.01)

(56) References Cited

U.S. PATENT DOCUMENTS

| | | | |
|---|---|---|---|
| 2,064,141 A * | 12/1936 | Askin | F28F 3/12 165/170 |
| 2,244,475 A * | 6/1941 | Raskin | F28F 3/12 62/526 |
| 2,270,745 A * | 1/1942 | Todd | E01C 13/105 165/136 |
| 2,900,175 A * | 8/1959 | McGuffey | 165/170 |
| 2,960,160 A | 11/1960 | Goodman | |
| 2,979,310 A * | 4/1961 | Nicholson | F28F 3/12 165/170 |
| 3,229,764 A * | 1/1966 | Ware | 165/167 |
| 3,246,689 A * | 4/1966 | Remde | F24D 3/16 165/170 |
| 3,731,736 A * | 5/1973 | Fernandes | 165/166 |
| 4,516,632 A | 5/1985 | Swift et al. | |
| 4,665,975 A | 5/1987 | Johnston | |
| 4,884,168 A * | 11/1989 | August | H05K 7/20254 165/80.4 |
| 5,245,843 A * | 9/1993 | Shimoya | B60H 1/3227 62/515 |
| 5,417,280 A * | 5/1995 | Hayashi | B60H 1/3227 165/153 |
| 5,471,913 A * | 12/1995 | Margittai | F28F 3/083 165/167 |
| 5,561,981 A | 10/1996 | Quisenberry et al. | |
| 5,836,383 A | 11/1998 | Zwittig | |
| 5,983,992 A | 11/1999 | Child et al. | |
| 6,250,380 B1 * | 6/2001 | Strahle | F28D 9/0043 165/167 |
| 7,417,857 B2 * | 8/2008 | Rondier | H01L 23/473 165/104.33 |
| 7,876,563 B2 * | 1/2011 | Shiba | H01L 23/473 165/80.4 |
| 7,998,345 B2 | 8/2011 | Jia et al. | |
| 2004/0003916 A1 * | 1/2004 | Nash et al. | 165/153 |
| 2004/0050052 A1 | 3/2004 | Niikura et al. | |
| 2004/0060689 A1 * | 4/2004 | Pfeifer et al. | 165/109.1 |
| 2004/0154788 A1 | 8/2004 | Symonds | |
| 2004/0159424 A1 | 8/2004 | Reinke et al. | |
| 2005/0133210 A1 | 6/2005 | Inagaki et al. | |
| 2005/0194123 A1 | 9/2005 | Strahle et al. | |
| 2008/0141985 A1 * | 6/2008 | Schernecker et al. | 165/167 |
| 2008/0202735 A1 | 8/2008 | Geskes et al. | |
| 2009/0151917 A1 | 6/2009 | Meschke et al. | |
| 2010/0319887 A1 | 12/2010 | Diem et al. | |

FOREIGN PATENT DOCUMENTS

| | | | |
|---|---|---|---|
| DE | 1 095 785 | | 12/1960 |
| DE | 36 06 253 C2 | | 11/1989 |
| DE | 43 27 857 A1 | | 3/1994 |
| DE | 195 28 116 A1 | | 2/1997 |
| DE | 103 13 685 A1 | | 10/2003 |
| DE | 103 16 044 A1 | | 10/2003 |
| DE | 10 2004 010 640 A1 | | 9/2005 |
| DE | 601 23 987 T2 | | 2/2007 |
| DE | 10 2006 013 503 A1 | | 1/2008 |
| DE | 10 2007 060 523 A1 | | 6/2009 |
| DE | 60 2005 006 296 T2 | | 7/2009 |
| EP | 0 292 245 A1 | | 11/1988 |
| EP | 0 497 339 A2 | | 8/1992 |
| GB | 1 277 872 A | | 6/1972 |
| GB | 2218794 A | * | 11/1989 .......... F28D 9/0081 |
| JP | 2005-180714 A | | 7/2005 |
| WO | WO 96/12316 A1 | | 4/1996 |
| WO | WO 2004/074755 A2 | | 9/2004 |
| WO | WO 2007/009713 A1 | | 1/2007 |

OTHER PUBLICATIONS

Chinese Office Action for Chinese Application No. 201080048294.5 dated Mar. 19, 2014 with English translation.
U.S. Appl. No. 13/457,974, filed Apr. 27, 2012.

* cited by examiner

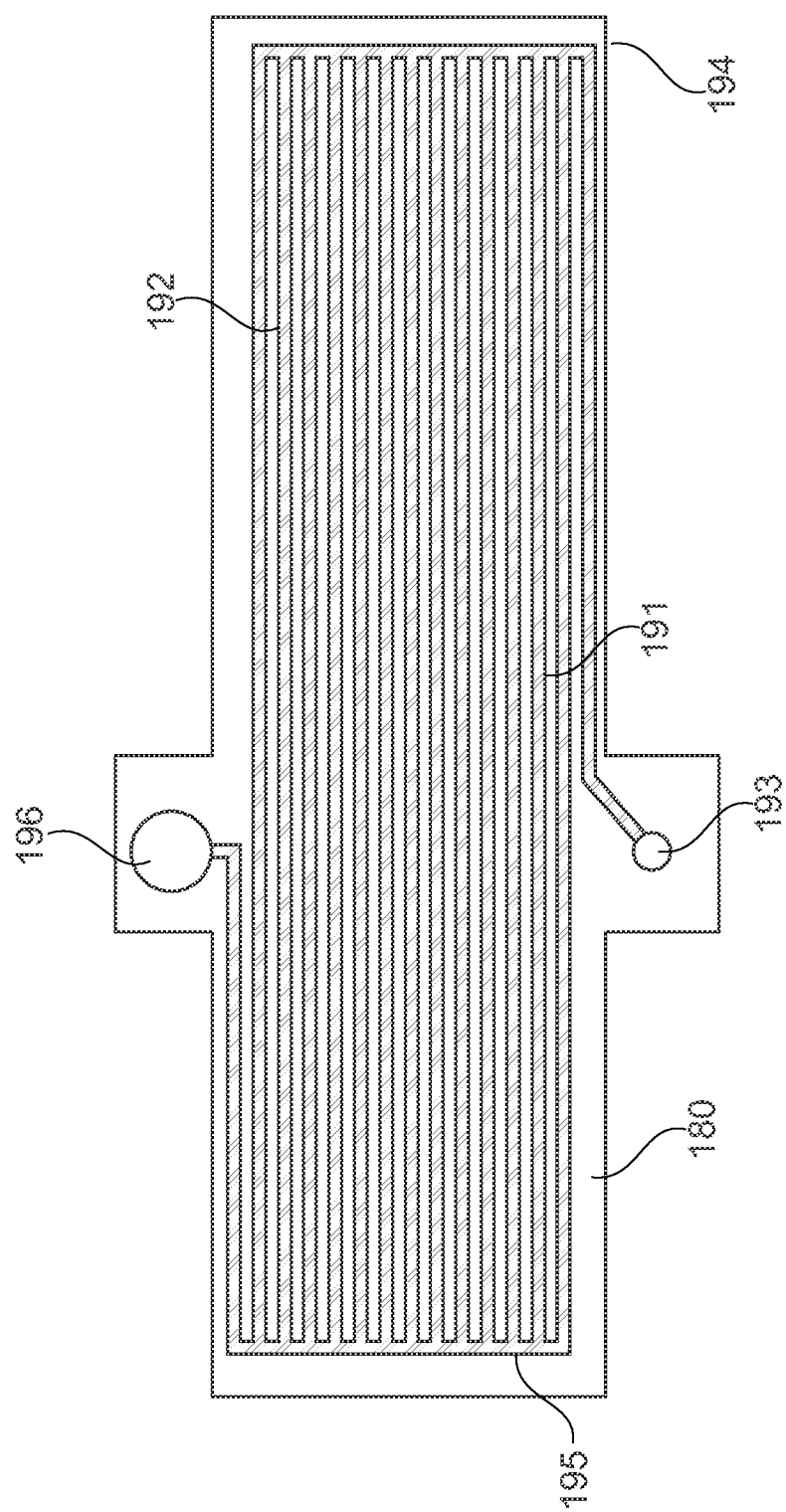

DEVICE FOR THE EXCHANGE OF HEAT AND MOTOR VEHICLE

This nonprovisional application claims priority under 35 U.S.C. §119(a) to German Patent Application No. DE 10 2009 012 493.4, which was filed in Germany on Mar. 12, 2009, and to German Patent Application No. DE 10 2009 050 889.9, which was filed in Germany on Oct. 27, 2009 and which are herein incorporated by reference.

BACKGROUND OF THE INVENTION

Field of the Invention

The invention relates to a device for an exchange of heat.

Description of the Background Art

A thermal energy recovery from exhaust gasses of an internal combustion engine is also becoming increasingly important in the field of motor vehicles. In particular, the focus is increasingly on thermal energy recovery by means of exhaust gas evaporators, in order to hereby achieve an increase in efficiency with respect to the operation of the internal combustion engine. In an exhaust gas evaporator, heat is extracted from the exhaust gas, which heat is fed to a coolant or refrigerant, which is then usually evaporated thereby. The thermal energy extracted from the exhaust gas can then be used, for example, for a downstream Clausius-Rankine process.

For example, German patent Application DE 601 23 987 T2, which corresponds to U.S. Publication No. 20040050052, deals with this topic, in which a Rankine cycle system is described in connection with an internal combustion engine, in which a high-temperature and high-pressure vapor can be produced using an evaporator by means of thermal energy of an exhaust gas of the internal combustion engine.

SUMMARY OF THE INVENTION

It is therefore an object of the present invention to provide a device for the exchange of heat that is compact and efficient, particularly with respect to use in a motor vehicle.

In an embodiment, flow paths are inserted in a tray heat exchanger, wherein at least the first flow path and/or at least some of the flow path sections is formed by etching, milling or embossing of at least one surface of a tray of a pair of trays. A simple procedure permitting optimal geometries of the flow paths can be advantageously allowed through the etching.

It is advantageous thereby if at least the first flow path and/or at least some of the flow path sections are formed by etching two opposite surfaces of two trays of a pair of trays.

It is also expedient if the first and/or the second flow path and/or at least some of the flow path sections thereof are composed of two channels running parallel, which are separated from one another by a web.

It is also advantageous if the web has at least individual or several interruptions.

Because the present exhaust gas evaporator is embodied in a so-called sandwich construction, in which exhaust gas planes and coolant planes are arranged alternately immediately next to one another, the exhaust gas planes can come into contact with the coolant planes over a large area, so that a thermal energy transmission from the exhaust gases to the coolant can be carried out particularly quickly and effectively.

Due to the large contact surfaces available between an exhaust gas side and an evaporator side of the exhaust gas evaporator, this can also be constructed in a very compact manner. This is particularly advantageous in the field of motor vehicles, since here components of a motor vehicle are to take up as little space as possible and the same time should be embodied to be very light. Thus, by means of the sandwich construction, a very powerful construction with respect to the interaction of the exhaust gas side and the evaporator side is advantageously present.

According to the present invention, a first flow chamber has a first flow path with flow path sections for the first medium that can be flowed through consecutively in opposite directions. Preferably, the flow path sections are separated from one another by a division wall arranged between the at least two trays of the at least one pair of trays.

In an embodiment, two flow path sections can be flowed through immediately after one another are connected to one another via a deflection section. According to an advantageous variant, the deflection section is formed by a cut-out, particularly advantageously by a through hole in the division wall. According to another advantageous embodiment, the deflection section is formed by a gap remaining between the division wall and a lateral limitation of the first flow chamber, particularly advantageously the pair of trays.

Further, two or more than two division walls can be embodied with one another in a one-piece manner. Particularly preferably, the two or more division walls are formed by an additional tray arranged between the at least two trays of the at least one pair of trays and embodied in particular as a corrugated sheet.

In an embodiment, at least one flow path section can have one, two or more than two flow channels that can be flowed through parallel to one another. For example, at least two of the flow channels of the at least one flow path section can be connected to one another via the deflection section. Through a predetermined number of flow channels connected in parallel, a pressure loss on the one hand and a retention time of the first medium in the first flow chamber on the other hand can be adjusted for an operation of the device according to the invention.

Further, the flow channels can be closed on their front faces, advantageously by a limitation of the first flow chamber, particularly advantageously by one or both trays of the pair of trays.

A first deflection section to a second flow channel can be arranged on a first division wall of a first flow channel on a first front face of the first flow channel, and a second deflection section to a third flow channel different from the second flow channel is arranged on a second division wall of the first flow channel on a second front face of the first flow channel lying opposite the first front face.

The flow channels together with the deflection channels can form a single flow path through the first flow chamber meandering in a serpentine manner.

The first and the second flow chamber can be flowed through in different main flow directions.

The second flow chamber can have a larger flow cross section than a flow path section of the flow path in the first flow chamber, in particular a larger flow cross section than the first flow chamber. An embodiment of this type is in particular designed for the operation with a liquid, optionally evaporating first medium and a gaseous second medium.

The device according to the invention is preferably used in a motor vehicle with an internal combustion engine, an exhaust pipe and advantageously used for the exchange of heat between a coolant in particular a cooling circuit of the internal combustion engine and the exhaust gas or between a refrigerant of a refrigerant circuit of an air-conditioning system and the exhaust gas, wherein the coolant or the refrigerant in particular is evaporated in the device. The exhaust gas is thereby preferably the second medium. Preferably, the first flow channels are thereby arranged essentially vertically, particularly preferred essentially perpendicular to a stand space of the motor vehicle.

The term "exhaust system" in this case can include those components through which exhaust gases of an internal combustion engine are guided after leaving the internal combustion engine. The term "exhaust system" thus also covers components of an exhaust gas recirculation. In particular, the exhaust gas evaporator described here can be integrated advantageously in an exhaust gas recirculation of this type.

The term "coolant" describes every evaporable working fluid by means of which thermal energy can be absorbed and transported in sufficient quantities. In particular water, which can also be present as water vapor, is particularly suitable for this purpose.

The term "sandwich construction" is essentially self-explanatory, wherein it is clear in particular in connection with the exhaust gas evaporator described here that the exhaust gas planes are arranged in an alternating manner with the coolant planes in or on the exhaust gas evaporator. The term "plate construction" is also often used for the term "sandwich construction."

The term "division wall" can also be understood in particular to mean that this division wall is arranged in at least one tray or also in both trays of the pair of trays.

It is thus also advantageous if more than one exhaust gas plane is provided on the exhaust gas side and/or more than one coolant plane is provided on the coolant side, since a heat transmission between the exhaust gases and the coolant can be realized much more effectively in particular with several exhaust gas planes or coolant planes. In particular the coolant planes can be connected in parallel so that it is ensured that all of the coolant planes can be supplied with coolant independently of one another. However, it is also possible that one or more coolant planes are connected in series to one another.

The exhaust gas planes and the coolant planes hereby can abut directly against one another with their respective broad sides or the exhaust gas planes and the coolant planes are arranged delimited from one another only by a separating device that conducts heat well. Preferably, each of the coolant planes is enclosed on both sides by respectively one exhaust gas plane, so that the coolant planes are always warmed or heated from two sides.

So that the exhaust gases in the exhaust gas plane on the one hand and the coolant in the coolant plane on the other hand can be guided through the exhaust gas evaporator, an embodiment provides that the exhaust gas evaporator can have an exhaust gas conducting device on the exhaust gas side and/or a coolant conducting device on the evaporator side which are spatially separated from one another.

The coolants can hereby be conducted particularly advantageously along and in the coolant plane, when several coolant channels running parallel to one another, such as flow channels, are arranged in each of the coolant planes. In particular long, narrow coolant channels can be advantageously provided hereby, in which the coolant can heat up quickly.

Through the described sandwich construction alone, in which exhaust gas planes and coolant planes can be arranged directly next to one another, a high output regarding the exhaust gas evaporator can be achieved with only a small installation space required. Because in this case additionally exhaust gas channels or coolant channels can be provided in the individual planes of the exhaust gas evaporator, a high productivity or an increased productivity can be achieved, even with very tight installation space constraints.

Furthermore, several exhaust gas channels can also be arranged running parallel to one another in the exhaust gas plane to guide the exhaust gases. For example, these exhaust gas channels can run with respect to their front faces from an exhaust gas evaporator input side in a linear manner through the exhaust gas evaporator to an exhaust gas evaporator output side. The exhaust gas channels are respectively opened on their front faces so that the exhaust gases can flow in into the exhaust gas channels via openings in the front faces and flow out again. Preferably a plurality of exhaust gas channels are arranged next to one another in the exhaust gas plane hereby, so that several exhaust gas channels are arranged between a first side area and a second side area. The exhaust gases can thus be guided through the exhaust gas evaporator over a broad area in the plurality of the exhaust gas channels in a first main flow direction.

The exhaust gas evaporator can be constructed particularly simply hereby when the coolant channels on the evaporator side are arranged aligned in a similar or even identical manner to the exhaust gas channels on the exhaust gas side.

However, so that the coolant can absorb thermal energy from the exhaust gases particularly effectively, it is advantageous if the coolant can remain in the exhaust gas evaporator for a sufficient length of time. This can be realized, for example, on the one hand in that the coolant passes through the exhaust gas evaporator at a lower flow rate. On the other hand, the exhaust gas evaporator can be designed to be longer. A preferred embodiment provides that the coolant in the exhaust gas evaporator in a coolant plane can cover a particularly long path through the exhaust gas evaporator. A long path of this type can be realized in a coolant plane particularly simply in structural terms when the coolant channels are spatially connected to one another. Through the spatial connection, the coolant can flow from one coolant channel to another coolant channel and thus remain in the exhaust gas evaporator for a particularly long time.

In particular in this context it is advantageous if the coolant channels are closed on their front faces. It is not necessary hereby for openings on front faces, for example, of two coolant channels directly next to one another and/or corresponding to one another to be connected to one another by a suitable casing. Instead, suitable connecting openings between two coolant channels can be provided in a common division wall.

An embodiment thus also provides that a first connecting opening to a second coolant channel is arranged on a first division wall of a first coolant channel on the first front face of the first coolant channel, and a second connecting opening to a further coolant channel is arranged on a second division wall of the first coolant channel on a second front face of the first coolant channel. All of the coolant channels of a coolant plane can be combined hereby to form a meandering coolant path. In principle, connecting openings of this type can be provided on each division wall. Coolant channels can also be connected in parallel in that the connecting openings are provided in a suitable manner on the division walls and/or on the front faces.

In order to be able to provide the longest possible coolant path in one of the coolant planes, it is therefore advantageous if the coolant planes together form a single meandering coolant path through the exhaust gas evaporator.

Furthermore, the exhaust gas evaporator can have a coolant path and an exhaust gas path, wherein the coolant path is arranged in a differently oriented manner in the exhaust gas evaporator than the exhaust gas path. The exhaust gases and the coolant can hereby flow through the exhaust gas evaporator in a cross flow, for example. It is clear that the exhaust gases and the coolant could also flow in counter flow to one another with correspondingly selected channels.

Also, an object of the invention is also attained by a method for operating an internal combustion engine of motor vehicle, in which exhaust gases of the internal combustion engine are guided into the environment by means of an exhaust system and thermal energy is extracted from the exhaust gases beforehand by means of evaporable coolant, and in which the exhaust gases within an exhaust gas evaporator are guided in a first main flow direction and the coolants are guided in a main flow direction opposite to the first main flow direction through the exhaust gas evaporator, wherein the coolants for some sections are guided through the exhaust gas evaporator transversely to the main flow directions. Advantageously, the exhaust gases and the coolant are hereby moved through the exhaust gas evaporator not only in counter flow to one another, but also in cross flow, whereby in particular the coolant can remain for a particularly long time in the exhaust gas evaporator and can hereby warm up or heat up particularly well.

Of course, the exhaust gas channels as well as the coolant channels can be arranged differently in the exhaust gas evaporator. In order in particular to reduce the risk that a critical accumulation of liquid, in particular water, can occur in one of the coolant channels, it is advantageous if the coolant channels are arranged essentially in a vertically aligned manner inside the exhaust gas evaporator, in particular essentially vertically to a road surface.

By means of the connecting openings, which can be arranged very close to the front face walls, in addition it can be avoided that reservoirs for water not yet evaporated, for example, are formed on the underside of a coolant plane. The risk of a reduction in efficiency of the exhaust gas evaporator due to water collection points of this type can hereby be avoided. With an embodiment variant that is particularly advantageous in this respect it can be provided that, in addition to the connecting openings, in particular an inlet opening of the coolant planes is also placed on the underside such that it can be ensured in an operationally reliable manner that the coolant channels of a coolant plane can be initially supplied with coolant, in particular with water. That is, coolant is ideally available at all coolant channels of the exhaust gas evaporator before startup of an internal combustion engine, so that a uniform evaporation of the coolant in the coolant planes can be ensured.

As long as a critical water accumulation in one of the coolant channels or one of the coolant planes can be avoided, it is also possible to provide the coolant channels or the coolant planes deflected out of a vertical alignment in the exhaust gas evaporator. A non-critical inclination angle of the exhaust gas evaporator to be adjusted accordingly, with which it is still avoided that, for example, a marginal coolant channel and/or a marginal coolant plane is critically flooded with water, but a marginal coolant channel lying opposite and/or a marginal coolant plane lying opposite is not, an inclination angle of this type that is still permitted and non-critical can be reduced by way of precaution by more than 5°, ideally by approx. 10°, so that unfavorable tilted positions can be guarded against, for example, due to a tilted installation of an internal combustion engine, an exhaust system in a motor vehicle and/or an unfavorable tilted position of the vehicle per se.

The term modification "marginal" can additionally characterize coolant channels and/or coolant planes, which compared to the other coolant channels or coolant planes are arranged outside on the exhaust gas evaporator.

The above-mentioned inclination angle can ideally be measured from a vertical plane.

It can thus be ensured that initially all of the coolant channels are supplied with a liquid coolant or with water. The risk is hereby reduced that, for example, a coolant channel not initially supplied with water conveys the evaporating water alone.

The channels of the exhaust gas evaporator can be formed and designed in different ways. For example, in particular the coolant channels can be embodied as a tube bundle or in plate construction with division webs. The exhaust gas evaporator can be produced in a structurally particularly simple manner if coolant channels of a coolant plane are formed by means of a corrugated sheet folded several times in the plane.

A corrugated sheet of this type, for example in combination with separating sheets arranged parallel to the present planes, can advantageously form the channels described here, wherein the exhaust gas channels can also be realized particularly simply by means of separating webs arranged on a separating sheet of this type.

In order to have the lowest possible flow losses inside the channels, smooth channel walls can be provided with another advantageous embodiment variant. In particular through differently selected dimensions of the channel sidewalls or channel base walls, the measurements of the coolant channels can be influenced virtually as desired.

For example, a change of the channel width can bring about a pressure loss and/or a change in the thermal energy transmission surface. Also the width of the channels can influence the number of channels in an exhaust gas evaporator and/or the total path of a coolant path of a coolant plane.

The exhaust gas conducting device and the coolant conducting device can also be structurally embodied in different ways. Thermal energy can be transferred particularly well from the hot exhaust gases into the coolant when the exhaust gas conducting device is embodied in an exhaust gas plane in parallel flow and the coolant conducting device is embodied in a coolant plane in serpentine flow. Because the exhaust gas conducting device is flowed through in parallel flow, the exhaust gases can pass through the exhaust gas evaporator, for example, at a high speed and non-critical back pressure, while the coolant can remain in the exhaust gas evaporator for a sufficient length of time due to the serpentine flow so that it can absorb the thermal energy particularly effectively.

Of course, depending on the case of use, even more advantageous embodiments can be carried out on the present exhaust gas evaporator. In particular, the flow guidance in exhaust gas evaporators can be a decisive criterion for a particularly good capacity. Furthermore, the strength of an exhaust gas evaporator can be essentially affected with channels embodied to be correspondingly rigid.

The capacity can run hereby in two optimization directions. On the one hand, the object is to achieve a minimal pressure loss, in that as far as possible no deflections or inner structures are present inside a path. On the other hand, the largest possible surface should be available for a thermal energy transmission. For the pressure loss, it should furthermore be taken into account that the working fluid greatly reduces its density with the change of the state of matter, in particular from liquid to gaseous, and this can multiply the flow rate.

A specific optimum between pressure loss and heat output must therefore be found.

In particular with exhaust gas evaporators, the strength, as already mentioned above, is another important subject, since the working medium, in particular a coolant, usually must be operated at operating pressures above ambient pressure in order to be able to achieve a sufficiently high effectiveness in connection with the exhaust gas evaporator. The selected geometries of the components used must thus also be able, for example, to easily absorb the compressive forces produced by the operating pressures occurring. It must also be possible to absorb thermal tensions caused, for example, by temperature differences between the two working media, that is, the exhaust gases on the one hand and the coolant on the other hand. The selected sheet thickness of a corrugated sheet also has a direct influence on the strength, in particular when individual sheet areas of the exhaust gas evaporator are used as tie rods. Furthermore, the sheet thickness can have an impact on the thermal conductivity.

Another way of increasing the effectiveness can be to provide turbulence-generating formations in the channels. This can easily be ensured through the structure of the present exhaust gas evaporator described above, in particular with respect to a corrugated sheet folded several times in a plane.

The exhaust gas evaporator described here can be advantageously installed in virtually all motor vehicles, in particular also in commercial vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 13 shows a tray.

DETAILED DESCRIPTION

Figure 1:
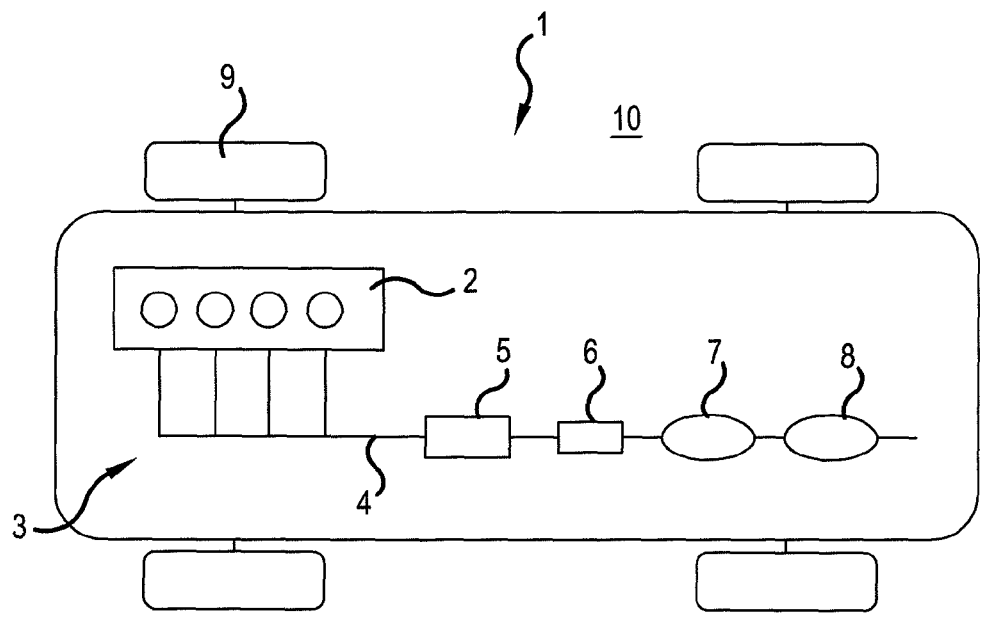
FIG. 1 is a view of a motor vehicle with an internal combustion engine and an exhaust system with an exhaust gas evaporator.

The motor vehicle 1 shown in FIG. 1 comprises an internal combustion engine 2 with a downstream exhaust system 3, in which in this exemplary embodiment an exhaust gas evaporator 6, an exhaust aftertreatment system 5, a middle muffler 7 and an end muffler 8 are arranged in an exhaust tract 4. The motor vehicle 1 stands with four wheels 9 (numbered here only by way of example) on a road substrate 10, which lines in the paper plane according to the representation of FIG. 1.

Figure 2:
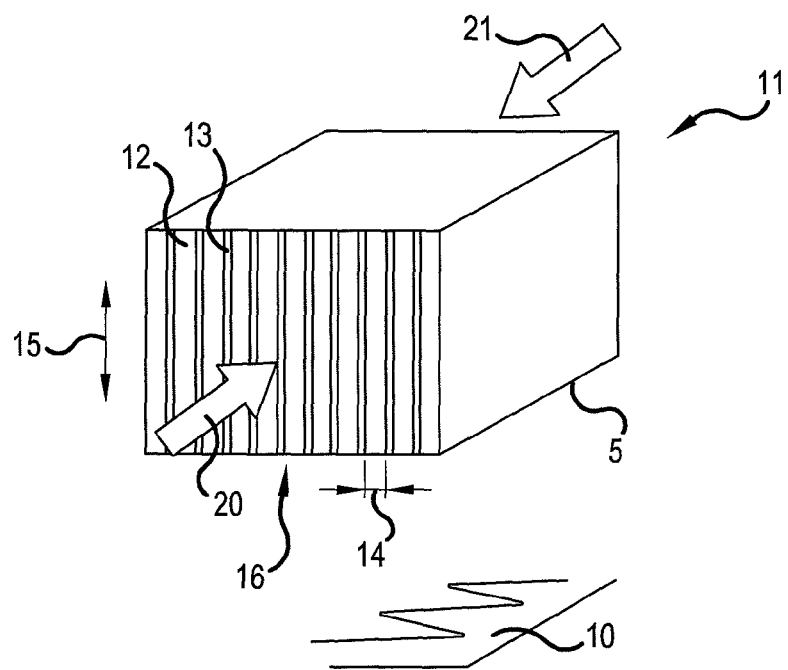
FIG. 2 is a perspective view of the exhaust gas evaporator from FIG. 1.
Figure 3:
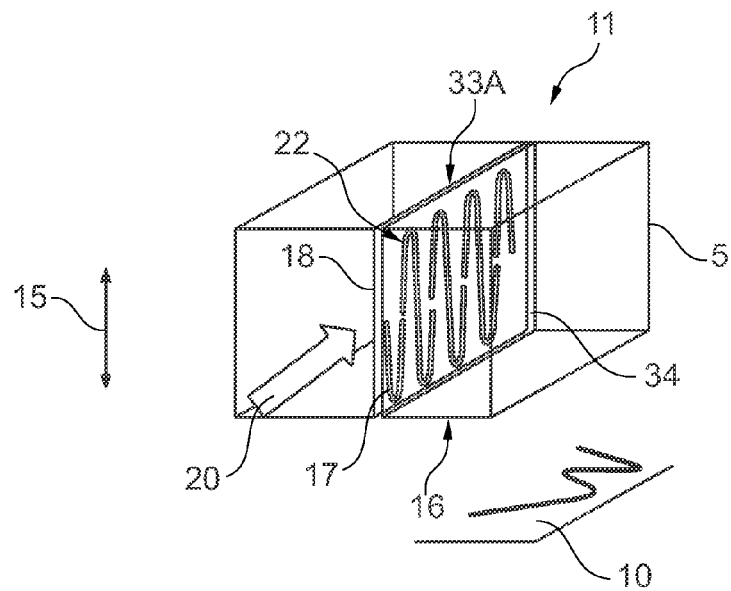
FIG. 3 is a partial section view of the exhaust gas evaporator from FIGS. 1 and 2.
Figure 4:
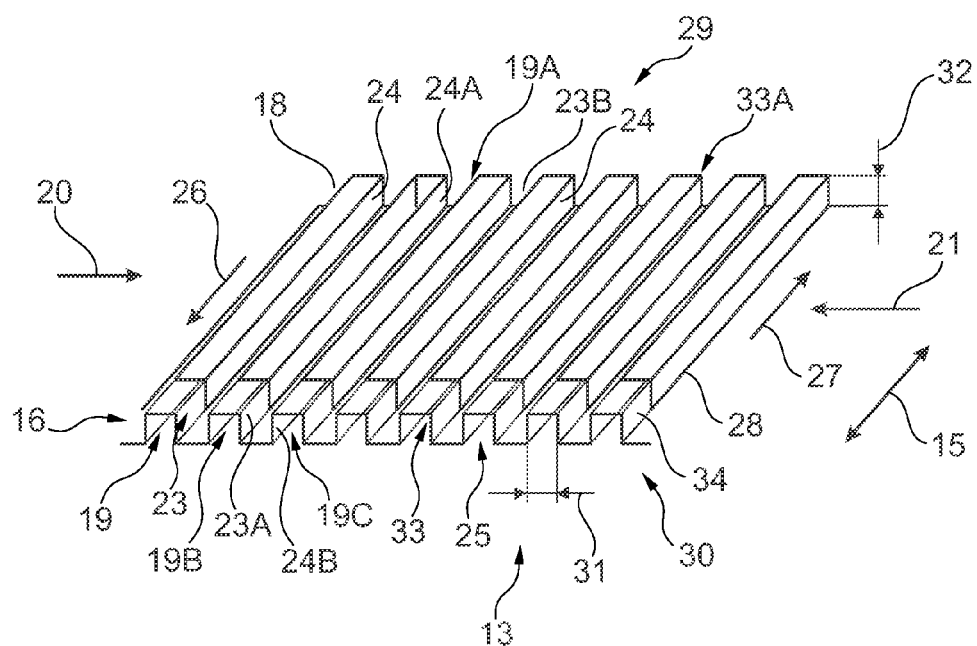
FIG. 4 is a perspective view of a corrugated sheet of the exhaust gas evaporator from FIGS. 1 through 3 to realize a first coolant plane.

The exhaust gas evaporator 6 is shown in a diagrammatically more detailed manner in FIGS. 2 through 4, wherein in particular in FIG. 2 the sandwich construction 11 of the exhaust gas evaporator 6 can be clearly seen with its many exhaust gas planes 12 (here numbered only by way of example) and with its many coolant planes 13 (here likewise numbered only by way of example). The exhaust gas planes 12 are hereby embodied to be somewhat larger in terms of their thickness 14 than the narrower coolant planes 13, so that exhaust gases can pass through the exhaust gas planes 12 more easily. Advantageously, in the sandwich construction 11 selected here the two outer planes are exhaust gas planes 12, so that it is ensured that all of the coolant planes 13 are enclosed on both sides by exhaust gas planes 12. The coolant can hereby be heated in the coolant planes 13 particularly quickly.

The coolant planes 13 as well as the exhaust gas planes 12 are arranged in the exhaust gas evaporator 6 in vertical alignment 15, wherein the underside 16 of the exhaust gas evaporator 6 is facing towards the road substrate 10. According to the sandwich construction 11 of the present exhaust gas evaporator 6, a coolant plane 13 follows an exhaust gas plane 12.

The coolant, which in this exemplary embodiment is water or in the heated state water vapor 17 (see FIG. 3), reaches a coolant channel 19 via an inlet opening 18 (see FIG. 4) according to a main flow direction 20. The coolant meanders in the coolant planes 13 through the exhaust gas evaporator 6 and hereby absorbs more and more thermal energy from the exhaust gases, which flow through the exhaust gas planes 12 according to the main flow direction 21 essentially in a linear manner.

While the coolant flows in a meandering manner along a coolant path 22 through the coolant plane 13, it respectively reaches further coolant channels 25 (here numbered only by way of example) of the coolant planes 13 via connecting openings 23 (here numbered only by way of example) through individual division walls 24 (here numbered only by way of example) and thus winds along the main flow direction 20. All of the coolant channels 19 and 25 are arranged essentially parallel to one another and essentially in a vertical alignment 15 in the respective coolant plane 13. The cooling channels 19 or 25 are hereby flowed through either in a first subsidiary flow direction 26 or in a second subsidiary flow direction 27, which run transversely to the two main flow directions 20 and 21.

A coolant conducting device 28, such as can provide several coolant channels 19 or 25 in one of the coolant planes 13 of the exhaust gas evaporator 6, is here composed of a corrugated sheet 29 with a smooth-fin geometry 30. By means of the corrugated sheet 29 the coolant conducting device 28 can be provided structurally in a particularly simple manner. Of course, depending on how the smooth-fin geometry 30 is selected with respect to a fin width 31 and/or a fin height 32, the total length of the coolant path 22 and the number of coolant channels 19, 25 can be varied. The fin height 32 in particular hereby determines a coolant channel height and the fin width 31 determines the coolant channel width, both of which are not explicitly drawn, since they result essentially from the fin height 32 or the fin width 31.

The coolant channels 19, 25 are closed on their front faces 33, 33A (not shown here, but numbered by way of example) so that the coolant can flow from one coolant channel 19 into the other coolant channels 25 only via the connecting openings 23, until the coolant leaves the coolant plane 13 again via an outlet opening 34 of the coolant conducting device 28. A deflection of the coolant along the coolant path 22 inside the coolant plane 13 is thus achieved by means of the connecting openings 23.

In the concrete exemplary embodiment according to FIG. 4, a first connecting opening 23A to a second coolant channel 19B is thus arranged on a first division wall 24A of a first coolant channel 19A on the first front face 33 of the first coolant channel 19A, and a second connecting opening 23B to a further coolant channel 19C is arranged on a second division wall 24B of the first coolant channel 19A on a second front face 33A of the first coolant channel 19A An exhaust gas conducting device is not shown here, since it is composed in a structurally simple manner essentially of exhaust gas channels embodied in a straight-line manner, the front faces of which are not closed, so that the exhaust gases can flow through them into the exhaust gas channels and flow out of the exhausts gas channels again. The exhaust gas conducting device can also be produced from a corrugated sheet, but without the connecting openings 23 described above. Because several exhaust gas channels are connected in parallel on the exhaust gas conducting device, the exhaust gas conducting device is designed in a multiflow manner in this exemplary embodiment. In contrast thereto, the coolant channels 19, 25 are connected in series on the coolant conducting device 28, since the coolant flows through all of the coolant channels 19, 25 consecutively. Thus the coolant conducting device 28 is embodied in a single-flow manner in this exemplary embodiment.

Of course, the exhaust gas evaporator 6 described represents only a first exemplary embodiment, but should not be understood to be restrictive with respect to the invention.

Figure 5:
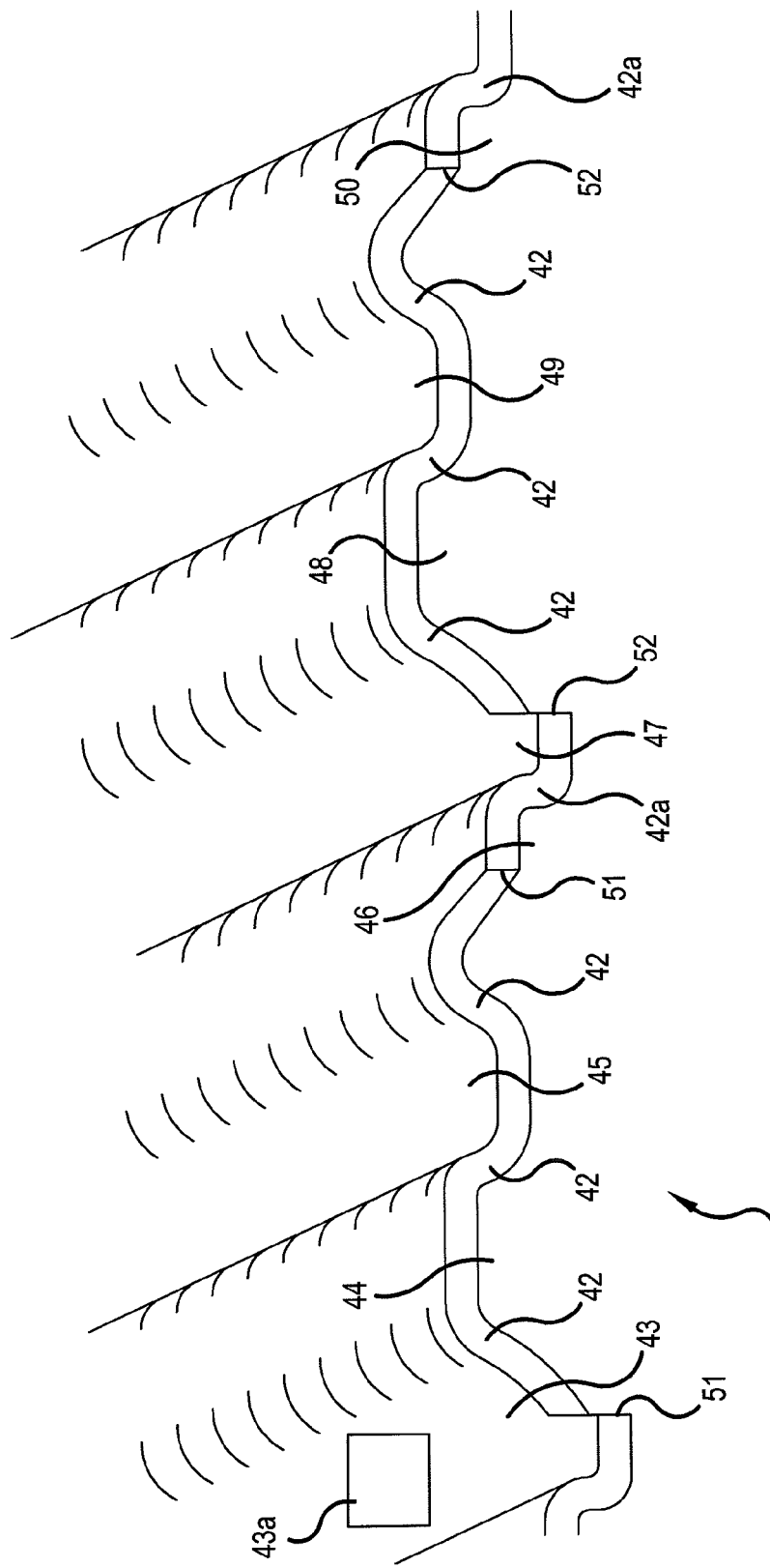
FIG. 5 is a perspective view of an alternative corrugated sheet.

FIG. 5 shows an additional tray embodied as a corrugated sheet 41, which is installed in a device (not shown further) for exchanging heat according to the invention. The corrugated sheet 41 has division walls 42, 42a embodied in a one-piece manner with one another, which separate flow channels 43, 44, 45, 46, 47, 48, 49, 50 from one another. The flow channels 43 and 45 hereby form a first flow path section, the flow channels 44 and 46 form a second flow path section, the flow channels 47 and 49 form a third flow path section and the flow channels 48 and 50 form a fourth flow path section.

The first and third flow path sections are thereby, for example, flowed through towards the observer, whereas the second and the fourth flow path sections are flowed through away from the observer. The first flow path section 43, 45 is thereby connected to the second flow path section 44, 46 via a deflection section formed by a cut-out 51. The second flow path section 44, 46 is connected to the third flow path section 47, 49 via a deflection section (not shown). The third flow path section 47, 49 is in turn connected to the fourth flow path section 48, 50 via a deflection section formed by a cut-out 52. The cut-outs 51, 52 produce the gaps forming the deflection sections between the division walls 42 and a side wall (not shown) of the first flow chamber in which the corrugated sheet 51 is arranged, which sidewall closes the flow channels on their front face facing towards the observer.

The division walls 42a, however, are connected to the sidewall so that the flow path sections are flowed through in the referenced sequence and alternately in opposite flow directions. This results for the first medium in a single flow path meandering in a serpentine manner through the first flow chamber, which is formed by a series connection of the flow path sections.

In particular the object of the invention is also attained with an exhaust system with an exhaust gas evaporator, which is connected downstream of an internal combustion engine of a motor vehicle, wherein the exhaust gas evaporator has a sandwich construction in which exhaust gas planes and coolant planes are arranged alternately immediately next to one another, wherein the exhaust gas evaporator preferably has an exhaust gas conducting device on the exhaust gas side and a coolant conducting device on the evaporator side, which are spatially separated from one another, wherein preferably several coolant channels running parallel to one another are arranged in each of the coolant planes, which coolant channels in particular are connected spatially among one another, wherein the coolant channels are preferably closed on their front faces.

Preferably, a first connecting opening to a second coolant channel is arranged on a first division wall of a first coolant channel on a first front face of the first coolant channel, and a second connecting opening to a further coolant channel is arranged on a second division wall of the first coolant channel on a second front face of the first coolant channel, wherein the coolant channels preferably together jointly form a single meandering coolant path through the exhaust gas evaporator and/or are arranged essentially aligned in a vertically manner inside the exhaust gas evaporator, in particular essentially vertically to a road surface, wherein the exhaust gas evaporator preferably has a coolant path and an exhaust gas path, wherein the coolant path is oriented differently in the exhaust gas evaporator from the exhaust gas path.

Preferably, coolant channels of a coolant plane are formed by means of a corrugated sheet folded several times in the coolant plane and/or the exhaust gas conducting device is embodied in a multiflow manner and the coolant conducting device is embodied in a single-flow manner.

In particular the object of the invention is also attained through a method for operating an internal combustion engine of a motor vehicle, in which exhaust gases of the internal combustion engine are guided into the environment by means of an exhaust system and beforehand thermal energy is extracted from the exhaust gases by means of evaporable coolant, wherein the exhaust gases are guided inside an exhaust gas evaporator in a first main flow direction and the coolants are guided through the exhaust gas evaporator in a main flow direction opposite to the first main flow direction, wherein the coolants for some sections are guided through the exhaust gas evaporator transversely to the main flow directions.

Device for the exchange of heat between a first and a second medium, with pairs of trays stacked one on top of the other in a stacking direction, wherein a first flow chamber that can be flowed through by a first medium is embodied between the two trays of at least one pair of trays and a second flow chamber that can be flowed through by a second medium is embodied between two pairs of trays adjacent to one another, wherein the first flow chamber has first flow path with flow path sections that can be flowed through consecutively in opposite directions for the first medium, which are separated from one another by a division wall arranged between at least two trays of the at least one pair of trays. It is expedient thereby when two flow path sections that can be flowed through immediately after one another are connected to one another via a deflection section. It is also expedient if the deflection section is formed by a cut-out in particular a through hole in the division wall. It is also expedient if the deflection section is formed by a gap remaining between the division wall and a lateral delimitation of the first flow chamber, in particular the pair of trays. It is also expedient if two or more than two division walls are embodied manner with one another in a one-piece. It is also expedient if the two or more division walls are formed by an additional tray arranged between the at least two trays of the at least one pair of trays and embodied in particular as a corrugated sheet. It is also expedient if at least one flow path section has one, two or more than two flow channels which can be flowed through parallel to one another. It is also expedient if at least two of the flow channels of the at least one flow path section are connected to one another via the deflection section. It is also expedient if the flow channels are closed on their front faces in particular by a delimitation of the first flow chamber, in particular through one or both trays of the pair of trays. It is also expedient if a first deflection section to a second flow channel is arranged on a first division wall of a first flow channel on a first front face of the first flow channel, and a second deflection section to a third flow channel different from the second flow channel is arranged on a second division wall of the first flow channel on a second front face lying opposite the first front face of the first flow channel. It is also expedient if the flow channels together with the deflection channels form a single flow path meandering in a serpentine manner through the first flow chamber. It is also expedient if the first and the second flow chamber can be flowed through in different main flow directions. It is also expedient if the second flow chamber has a larger flow cross section than a flow path section of the flow path in the first flow chamber, in particular a larger flow cross section than the first flow chamber.

Figure 6:
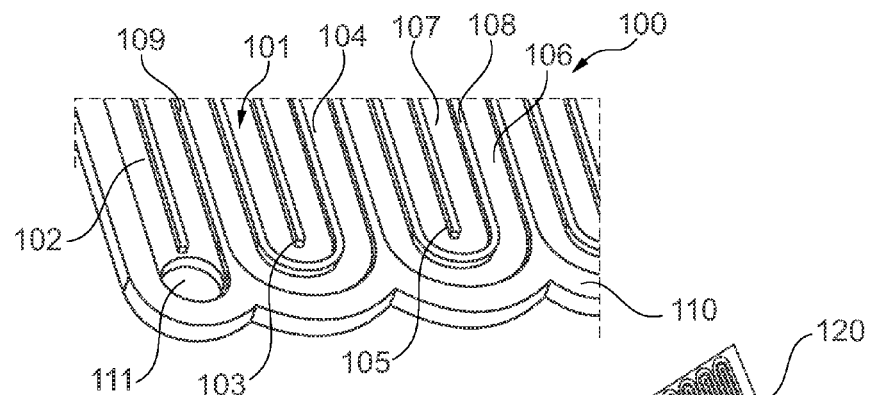
FIG. 6 is a perspective view of a section of a tray with flow path.

FIG. 6 shows diagrammatically a section of a tray 100 with a flow path 101, which is composed of flow path sections 102, 103, 104, 105. The flow path 101 is thereby composed of sections 102, 103, 104, 105 arranged in a row next to one another in an essentially meandering or winding manner, which are lined up next to one another over essentially the entire extension of the tray 100 and are surrounded by an edge 110 of the tray 100. Advantageously, the flow paths 101 or the sections 102, 203, 104, 105 in this regard are embodied in a multiple parallel manner, wherein a web 108 is provided between the individual parallel partial paths 106, 107, which web separates the partial paths 106, 107 at least in some sections. Furthermore, a web 109 is provided between different sections. In the exemplary embodiment of FIG. 6, the tray 100 is closed to the outside by a turned up edge 110 or web, wherein the contour of the edge is embodied to be either straight or curved in some areas. At one end of the flow path 101, either a path is provided in order to guide the fluid from there to a connection or in order to guide the fluid away directly through an opening 111.

Figure 7:
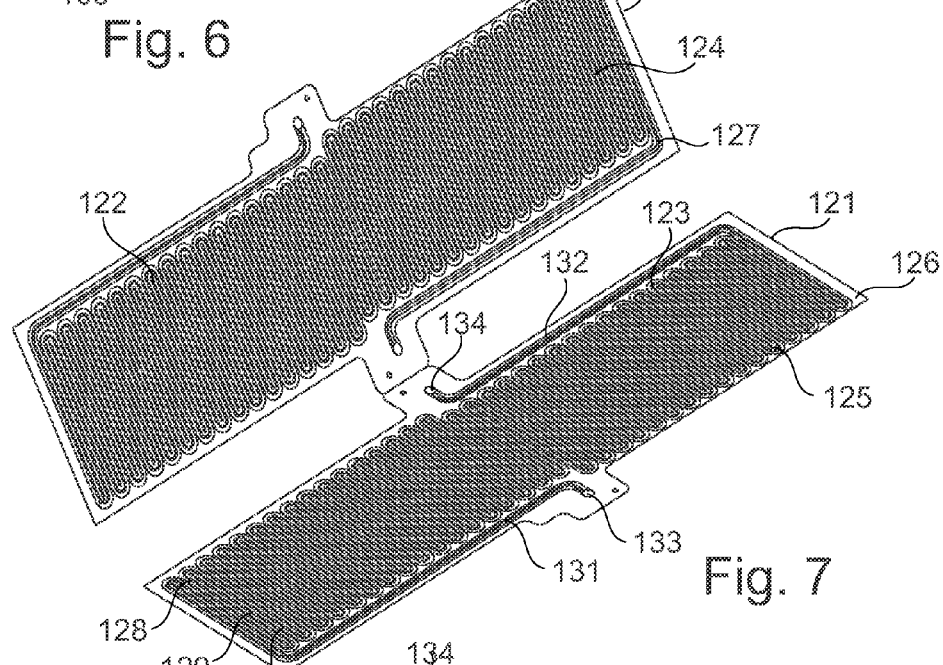
FIG. 7 is a perspective view of a pair of trays with flow paths.
Figure 8:
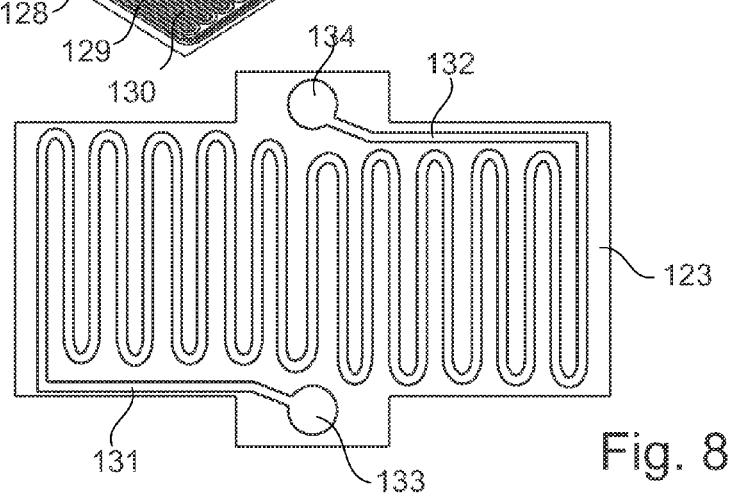
FIG. 8 is a view of a tray with flow path.

FIG. 7 shows diagrammatically an arrangement of two trays 120, 121 with respectively one flow path 122, 123, which is respectively composed of flow path sections 124, 125. The respective flow path 122, 123 is thereby composed of sections arranged in a row next to one another essentially in a meandering or winding manner, which are arranged in a row next to one another essentially over the entire extension of the tray 120, 121 and are surrounded by an edge 126, 127 of the tray 100. The two trays are thereby embodied essentially in a mirror-image manner, so that the channels or flow paths 122 of the first tray 120 come to rest on the flow paths 123 of the second tray 121, when they are laid one on top of the other. The trays are thereby advantageously soldered at the edges and/or in the area of webs between the path sections in order to form a closed tray with flow path. The flow paths 122, 123 or sections 124, 125 in this regard are also embodied in a multiple parallel manner, wherein a web 130 is provided between the individual parallel partial paths 128, 129, which web separates the partial paths 128, 129 at least in some sections. At the ends of the respectively meandering or winding flow path 122, 123 of a tray 120, 121 a path 131, 132 is provided in order to guide the fluid from the end of the respective meandering or winding flow path to a connection 133, 134. The connection 133, 134 is thereby advantageously an opening, through which the fluid can be guided in or away. FIG. 8 shows this again diagrammatically.

Figure 9:
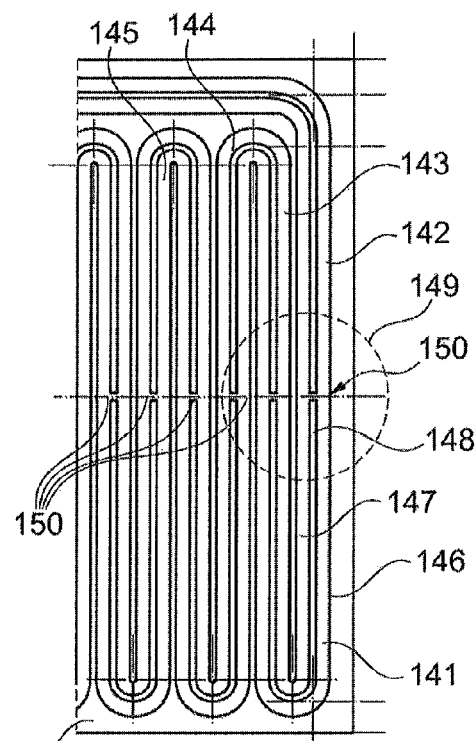
FIG. 9 is a view of a section of a tray with flow path.

FIG. 9 shows diagrammatically a section of a tray 140 with a flow path 141, which is composed at least of flow path sections 142, 143, 144, 145. The flow path 141 is thereby composed of sections 142, 143, 144, 145 lined up next to one another essentially in a meandering or winding manner, which are lined up essentially over the entire extension of the tray. Advantageously, the flow paths 141 or sections 142, 143, 144, 145 in this regard are embodied in a multiple, for example, two-fold, parallel manner, wherein a web 148 is provided between the individual parallel partial paths 146, 147, which web separates the partial paths 146, 147 at least in some sections. As can be seen in the marked area 149, the web is interrupted at provided regions in order to permit an exchange of the fluid between the partial paths. These interruptions 150 are advantageously arranged distributed over the length of the path 141 or the paths.

As can be seen in FIG. 9, a plurality of interruptions 150 of the web are provided, as are expediently provided approximately in the middle of sections 142, 143, 144, 145. In another exemplary embodiment, the interruptions can also be distributed differently, such as, for example, more than one interruption in one section and/or less than one interruption in one section.

Figure 10:
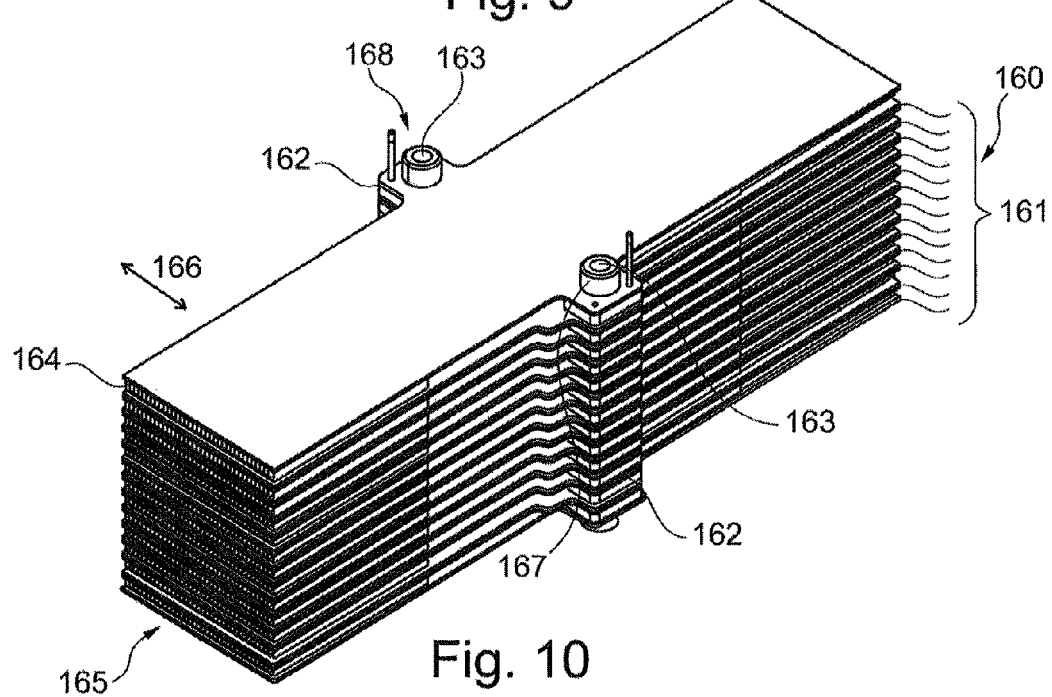
FIG. 10 is a perspective view of a device with trays stacked one upon the other.

FIG. 10 shows a device according to the invention for the transmission of heat 160, such as heat exchangers, in which a plurality of pairs of trays 161 are assembled soldered to form a flow channel, and wherein these pairs of trays 162 with the interposition of a respective fin layer 164 are stacked one on top of the other. As can be seen, a plurality of pairs of trays with fins are stacked alternately one on top of the other and connected to form a heat exchanger.

The trays 161 thereby have laterally arranged extensions 162, in which openings or connections 163 are provided for feeding and discharging a fluid. Advantageously, the openings 163 of the individual pairs of trays 161 are arranged aligned one on top of the other. It is particularly advantageous thereby if all of the pairs of trays or also only a lower number of individual trays are connected and flowed through in parallel. It can also be advantageous if all of the pairs of trays or also only a lower number of pairs of trays are flowed through in series. In another exemplary embodiment it can definitely be advantageous if individual pairs of trays are flowed through in parallel, and these in turn are connected in series with other pairs flowed through in parallel.

The fin layers 164 are advantageously embodied as a rolled fin layer, the flow-through direction 165 of which is aligned essentially perpendicular to the main flow direction 166 of the pairs of trays 161.

The heat exchanger 160 thus has channels that are arranged in the pairs of trays 161 and through which a fluid flows, and it furthermore has channels between at least two pairs of trays 161, through which a second fluid flows. The first fluid is advantageously a liquid coolant and the second fluid is advantageously a gas, such as an exhaust gas. The liquid coolant can thereby evaporate between the inlet 167 and the outlet 168, so that it is guided into the heat exchanger as a liquid and leaves the heat exchanger as a gas. In the case of the change of the state of matter of the first fluid it is advantageous if the cross section of the outlet 168 is larger than the cross section of the inlet 167.

Figure 11:
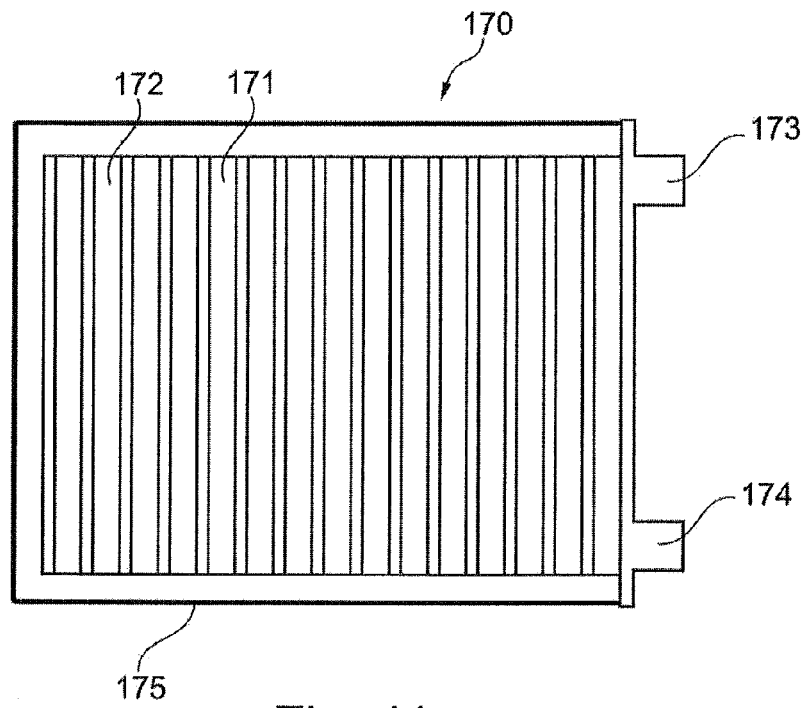
FIG. 11 is a diagrammatic view of trays stacked one upon the other in cross section with flow path.

FIG. 11 shows diagrammatically the arrangement of the heat exchanger 170, in which areas 171 with flow paths of the first fluid alternate with areas 172 with flow paths of the second fluid. Furthermore two connections 173, 174 are thereby discernible, which serve as inlet or outlet connections for the feed or discharge of the first fluid.

The heat exchanger 170 furthermore has a housing 175, which accommodates the core with areas 171, 172 with flow channels and thus provides a guide for the flow of the second fluid through the flow channels. Connections for the feed and the discharge of the second fluid, for example, are not discernible.

Figure 12:
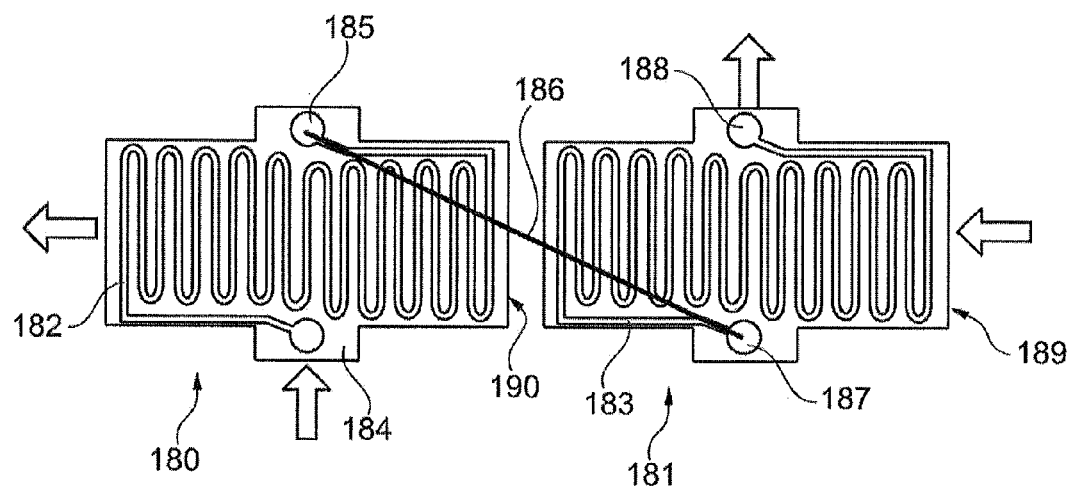
FIG. 12 is a diagrammatic view of two blocks of trays stacked one upon the other with flow path.

FIG. 12 shows diagrammatically an arrangement of two stacks of pairs of trays 180, 181, with respectively one flow path, which are flowed through in series. As can be seen, the first fluid is fed in an inlet 184 of the pair of trays 180. It flows through the flow path 182 to the outlet 185 of the pair of trays 180, from there through a flow path connection 186 into an inlet 187 of the second pair of trays 181. It flows from there in turn through the flow path 183 of the second pair of trays 183 to the outlet 188 before it flows off. At the same time, the flow paths 189, 190 for the second fluid, for example, exhaust gas, are flowed through in series, as indicated.

FIG. 13 shows diagrammatically a tray 180, wherein the first flow path 191 has several flow path sections 192, which are not only arranged essentially parallel to one another, but also are connected to one another in the manner of a parallel connection. The first medium therefore flows from an inlet 193 to a vertical channel 194, from there is distributed among several flow path sections 192 and flows in the opposite direction to an outlet channel 195 before it flows off through an outlet 196.

According to the invention, it is expedient if the trays are produced from or are composed of metal, such as steel or stainless steel. It is particularly expedient thereby if the flow paths are inserted in the trays by etching between trays of a pair of trays, so that a channel structure is produced through which the first fluid flows in a targeted manner. The trays can also be built up of three or more layers, wherein the center tray or the center trays have through slots that form the described channel structure and a smooth upper and lower tray seal the channel structure.

Advantageously, the heat exchanger is used for heat recovery from exhaust gas and thereby serves to increase the efficiency of internal combustion engines. One possibility is the use of a Rankine process, and for this process a heat exchanger is required as an exhaust gas evaporator.

The flow guidance in the evaporator is thereby the decisive criterion for the capacity and the strength of these components.

The heat exchanger, advantageously also as exhaust gas evaporator, is assembled from soldered pairs of trays with structures etched therein as flow paths with flow paths forming between the pairs of trays, i.e., the channels for the flow guidance of water/vapor and of exhaust gas are arranged alternately. The two fluids flow advantageously in counter flow or in cross flow or in cross counter flow.

The first fluid flows in a meandering manner through the flow paths formed in the pairs of trays. A stack is assembled and soldered from the pairs of trays with gas fins lying therebetween. This stack is advantageously also optionally installed in a housing.

According to the invention, it is advantageous if the structures are produced in the trays of the pairs of trays by etching, milling or embossing, so that the flow paths provided between the trays of a pair of trays can be produced by etching. As described above, it is advantageous thereby if the flow paths are composed of at least two or more channels running parallel with intermediate web, which increases the compressive strength of the pairs of trays. It is furthermore advantageous if the so-called intermediate webs have individual or several interruptions between the flow paths or partial flow paths running parallel, in order to render possible an equalization of pressure between them.

Furthermore, it is advantageous if the heat exchanger is formed from a number of cores which are composed of pairs of trays and fins arranged therebetween, which are connected to one another in series in order to thus reduce a thermal expansion.

Furthermore, it is advantageous if the inlet and/or the outlet is located essentially seen in the cooler longitudinal direction at the same height as the pair of trays and/or advantageously in the tray center of the pair of trays in order not to impede a thermal expansion of the trays in the longitudinal direction too much. For example, a center fixed bearing and loose ends are formed thereby.

According to the invention, tray center means a region that extends from the geometric center of the heat exchanger in both longitudinal directions 0 to 20 percent, preferably 0 to 10 percent of the entire length of the heat exchanger.

Furthermore, it is advantageous if the inlet and or the outlet are arranged laterally on the heat exchanger in order not to impede the gas flow.

It can also be advantageous if the first flow path has respectively at least one element 43a (FIG. 5) that is embodied to produce an increased pressure loss. The element 43a is hereby preferably embodied as a nozzle, orifice plate or as a labyrinth. This ensures a uniform medium distribution of the first medium among the respective first flow chambers.

It is advantageous to adapt the geometry of the medium channels to the local state of matter, since the density of vapor is much lower than that of the liquid and thus different requirements result for the heat-transferring surface. This can be carried out through a change in the cross section or parallel connection of several medium channels.

It is also advantageous if outlet diameter is greater than the inlet diameter in order to reduce the pressure loss.

The gas fin in its longitudinal direction can also advantageously be embodied variably with respect to fin thickness, fin division etc, in order to change the heat input in the second fluid depending on the fluid state.

Advantageously, the pair of trays and the flow path to be provided therein can be produced by two trays or plates with only one solder plane.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for an exchange of heat between a first and a second medium, the device comprising
a plurality of pairs of trays stacked one on top of the other in a stacking direction;
a first flow chamber through which a first medium is flowable is provided between two trays of at least one pair of trays; and
a second flow chamber through which a second medium is flowable is provided between two pairs of trays adjacent to one another,
wherein the first flow chamber has a first flow path with flow path sections that are configured to be flowed through consecutively in opposite directions for the first medium, and which are separated from one another by a division wall arranged between the two trays of the at least one pair of trays, and
wherein the second flow chamber has a second flow path for the second medium,
wherein at least one surface of a tray of the at least one pair of trays is an etched, milled or embossed surface, the etched, milled or embossed surface defining the first flow path and/or at least a portion of the flow path sections,
wherein a medium outlet has a larger cross section than a medium inlet,
wherein the first flow path is composed of two separate channels running parallel, each separate channel having flow path sections that are configured to be flowed through consecutively in opposite directions, the two channels being separated from one another by a web, wherein all of the flow path sections of each separate channel of the first flow path, except for curved portions of the flow path sections, extend perpendicular to a longitudinal direction of the device,
wherein the web has at least one interruption, the at least one interruption comprised of an opening to permit an exchange of fluid between the two separate channels,
wherein the medium inlet connects to a start of the flow path sections via inlet paths that run perpendicular to the two parallel separate channels and the medium outlet connects to an end of the flow path sections via outlet paths that run perpendicular to the two parallel separate channels, wherein the inlet paths and the outlet paths extend parallel to the longitudinal direction of the device,
wherein, except for a position of the at least one interruption, the web extends continuously along the flow path sections and has a constant width from the medium inlet to the medium outlet, and
wherein the medium inlet and the medium outlet are arranged laterally at the tray center of the plurality of pairs of trays, the medium inlet and the medium outlet forming a center fixed bearing that fixes the plurality of pairs of trays, such that the plurality of pairs of trays have a center fixed bearing and loose ends extending therefrom.

2. The device according to claim 1, wherein two opposite surfaces of the two trays of the at least one pair of trays are etched, milled or embossed surfaces, the etched, milled or embossed surfaces defining the first flow path and/or at least some of the flow path sections.

3. The device according to claim 1, wherein a medium inlet and outlet are arranged at a same height in a cooler longitudinal direction.

4. The device according to claim 1, wherein the first flow path has at least one element that is configured to produce an increased pressure loss and is configured as a nozzle, an orifice plate or a labyrinth.

5. The device according to claim 1, wherein the plurality of pairs of trays is formed by three or more pairs of trays lying one on top of the other and connected to one another by an adhesive force, wherein two outer pairs of trays and at least one center pair of trays is provided.

6. The device according to claim 1, wherein the inlet paths and the outlet paths are disposed in a same plane as the flow path sections of the two parallel separate channels.

7. The device according to claim 1, wherein the web extends continuously along the flow path sections such that the web includes straight sections and curved sections and wherein the at least one interruption is provided as a single interruption in each straight section of the web.

8. The device according to claim 1, wherein the medium inlet is provided on an opposing lateral side of the device as the medium outlet.

* * * * *